UNITED STATES PATENT OFFICE.

RAYMOND B. PRICE, OF MISHAWAKA, INDIANA, ASSIGNOR TO RUBBER REGENERATING COMPANY, A CORPORATION OF INDIANA.

PROCESS OF TREATING RUBBER ARTICLES AND PRODUCT THEREOF.

1,184,015.   Specification of Letters Patent.   Patented May 23, 1916.

No Drawing.   Application filed June 23, 1911.   Serial No. 634,870.

*To all whom it may concern:*

Be it known that I, RAYMOND B. PRICE, a citizen of the United States, residing at Mishawaka, in the county of St. Joseph, State of Indiana, have invented new and useful Improvements in Processes of Treating Rubber Articles and Product Thereof, of which the following is a specification.

Fully nine-tenths of the rubber articles now being manufactured embody in their structure more or less fabric or fiber, and the object of the present invention is to produce a more intimate union between said fabric or fiber and the rubber. This object I accomplish primarily by treating the fabric or fiber with a substance having a greater adhesive affinity for rubber than has fabric or fiber, which will act in much the same manner as does the usual flux employed in uniting metals.

One method of carrying out my process is to coat the fabric or fiber mechanically with a substance having an affinity for rubber, such as finely divided copper, though any other suitable metal may be employed. I also contemplate employing a solution of sulfate or chlorid of copper or other metal suitable for the purpose, and I may also employ a method or methods of precipitating the metal or salt employed upon or in the fabric or fiber. In fact, my invention contemplates in its broadest aspect the application of a substance, either before or during vulcanization, to a fabric or fiber to be used in conjunction with rubber compound to cause a more intimate union between the rubber and the fabric or fiber either prior to or during vulcanization. And my invention also contemplates the employment of such a substance in connection with reclaimed rubber, either alone or compounded, when employed with fabric or fiber.

While in most instances, especially where metal is employed as the uniting agent, the action upon the rubber during vulcanization will be a chemical one, still I do not limit myself to such chemical action, but contemplate the employment of any substance, whether acting chemically or not, which will cause a more intimate union between the rubber and the fabric or fiber. Thus, I contemplate employing such substances as are highly hygroscopic in character, such as quick lime, which when employed in a powdered state will absorb practically all of the moisture on or in the fabric or fiber, thus increasing the adhesion of the latter to rubber.

The desired intimate union between the fabric and rubber which is attained as above described, is in most cases the result of a quicker and therefore a harder cure of that portion of the rubber which comes in contact with the substance with which the fabric is associated than would otherwise be the case. It is desirable to have as little of the rubber thus over treated as is possible without defeating the ends sought. Therefore, the fabric or fiber is treated instead of the rubber itself. By treating the fabric it is only that portion of the rubber which comes in contact with the fabric, that is thus cured; while if the treatment were applied to the rubber instead of the fabric, the vulcanization which necessarily follows would result in a harmful over-curing of portions of the rubber not needed for attaining the desired intimate union.

There are many substances which may be used to obtain the result desired, some of which give better results than others, and some of which, besides acting to quicken the cure also give other beneficial results. Sulfur and some of its compounds as thiocarbanilid which has a formula

give satisfactory results when used in the treatment of the fabric. These substances are preferably applied to the fabric in solution, the liquid being subsequently removed by evaporation. The sulfur may be dissolved in either carbon bisulfid, turpentine or carbontetrachlorid and the thiocarbanilid may be dissolved in an acetone solution. Other substances which have been found of advantage in treating the fabric or fiber to secure a better union of the rubber are sodium polysulfid dissolved in water, a solution of lead resinate, a solution of palm oil, potassium stearate dissolved in alcohol, and a self-curing cement formed by blending rubber, litharge and sulfur in gasolene. Copper or metallic lead may also be used in the treatment of the fabric or fiber and may be applied thereto by electrolysis or by precipitation, or an oxid of copper may be precipitated in the fabric or fiber. Beneficial results have also been obtained by mercerizing the fabric, or by treating it with an alkali. An application of soot to the fabric will also give beneficial results. While the soot may be obtained from any source, it may, however, be produced by suitably burning the fuzz appearing on the fabric, the removal of the fuzz being of itself beneficial in securing a better union of the rubber and fabric. Calcium oxid or hydroxid in powdered form may also be used. This can be applied in any suitable manner as for instance by means of a blast. It is also possible to apply the sulfur, copper and other of the mentioned substances in a dry, finely divided state by means of a blast, friction or otherwise. I have also obtained beneficial results by using various of the above treatments in combination. For instance, the fabric or fiber may first be treated to a solution of an alkali, and after being dried may be dipped in a solution of sulfur or thiocarbanilid, after which it is finally dried.

In an application filed by me of even date herewith, Serial No. 634,969, I have disclosed the idea of causing a more intimate initial relation mechanically between the fabric or fiber and the rubber prior to vulcanization, and I wish it to be understood that I contemplate employing the present invention either in conjunction with any of the processes described in said companion application or alone.

Having thus described my invention, what I claim as new and desire to secure by Letters Patent is:

1. The process of uniting fabric or fiber and rubber into intimate relation with each other, which consists in treating the fabric with an application of a metal, applying unvulcanized rubber to the fabric, and finally vulcanizing the rubber.

2. The process of uniting fabric or fiber and rubber into intimate relation with each other which consists in treating the fabric with an application of copper, applying unvulcanized rubber to the fabric, and finally vulcanizing the rubber.

3. The process of uniting fabric or fibrous material and a rubber compound containing a vulcanizing medium which consists in treating the fabric with a non-vulcanizing medium which will be non-detachably associated with the fabric and which has greater adhesion for rubber than the fabric, applying unvulcanized sulfur-containing rubber to the fabric so treated and finally vulcanizing the rubber.

4. As an article of manufacture the combination of fibrous material, a uniting non-vulcanizing agent impregnated in the fibrous material and having greater adhesion for rubber than has the fibrous material, and sulfur-containing rubber vulcanized in intimate association with the fibrous material and agent.

In testimony whereof, I have hereunto set my hand in the presence of two subscribing witnesses.

RAYMOND B. PRICE.

Witnesses:
C. J. DUNPHY,
C. P. TOLSON.